United States Patent

Nishina et al.

[11] Patent Number: 5,140,933
[45] Date of Patent: Aug. 25, 1992

[54] CAR LOCATOR

[76] Inventors: Dorothy O. Nishina, 78-6401 Mamalahoa Hwy., Holualoa, Hi. 96725; George Spector, 233 Broadway, Rm 3815, New York, N.Y. 10007

[21] Appl. No.: 707,837

[22] Filed: May 30, 1991

[51] Int. Cl.⁵ .............................................. B60Q 7/02
[52] U.S. Cl. ................................ 116/209; 116/28 R; 40/591
[58] Field of Search ............... 116/28 R, 209; 40/591, 40/592, 600, 610

[56] References Cited

U.S. PATENT DOCUMENTS

| | | | |
|---|---|---|---|
| 2,957,261 | 10/1960 | Moskowitz | 40/600 |
| 3,286,386 | 11/1966 | Glantz | 40/592 |
| 3,422,556 | 1/1969 | Lyons et al. | 40/592 X |
| 3,440,748 | 4/1969 | Hackley | 40/592 |
| 3,670,438 | 6/1972 | Carroll et al. | 40/600 |
| 3,797,151 | 3/1974 | Dexter | 40/600 X |
| 4,489,306 | 12/1984 | Scolari | 340/107 |
| 4,663,874 | 5/1987 | Sano et al. | 40/621 |

Primary Examiner—William A. Cuchlinski, Jr.
Assistant Examiner—W. Morris Worth

[57] ABSTRACT

An apparatus for locating a motor vehicle is provided that can be magnetically attached to the motor vehicle so that indicia thereon can be easily seen at substantial distances from the motor vehicle. A housing having a magnet imbedded within a rear side surface for magnetic attachment of the housing to the vehicle in the vicinity of a door. An L-shaped flap extends laterally from a lower edge of the housing and is securable between a closed door and the door frame of the vehicle. Telescopic panel segments having indicia thereon are extendable upwardly out of the housing to provide an elevated message.

1 Claim, 1 Drawing Sheet

CAR LOCATOR

BACKGROUND OF THE INVENTION

The instant invention relates generally to temporary identification devices and more specifically it relates to an apparatus for locating a motor vehicle.

Numerous temporary identification devices have been provided in prior art that are adapted to be applied to automobiles. For example, U.S. Pat. Nos. 3,286,386 3,422.556 and 3,440,748 all are illustrative of such prior art. While these units may be suitable for the particular purpose to which they address, they would not be as suitable for the purposes of the present invention as heretofore described.

SUMMARY OF THE INVENTION

A primary object of the present invention is to provide an apparatus for locating a motor vehicle that will overcome the shortcomings of the prior art devices.

Another object is to provide an apparatus for locating a motor vehicle that can be magnetically attached to the motor vehicle so that indicia thereon can be easily seen at substantial distances from the motor vehicle.

An additional object is to provide an apparatus for locating a motor vehicle that can be secured between upper portion of a door and door frame so that it cannot be easily removed therefrom.

A further object is to provide an apparatus for locating a motor vehicle that is sample and easy to use.

A still further object is to provide an apparatus for locating a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
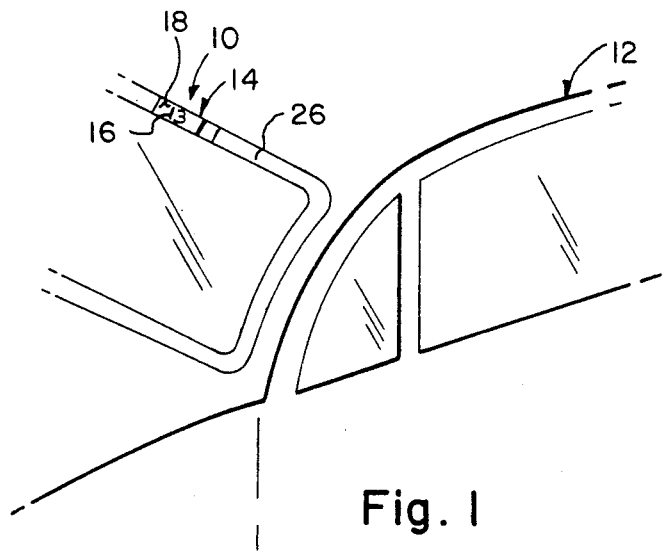
FIG. 1 is a perspective view of the invention magnetically attached to upper portion of windshield molding on a motor vehicle.
Figure 3:
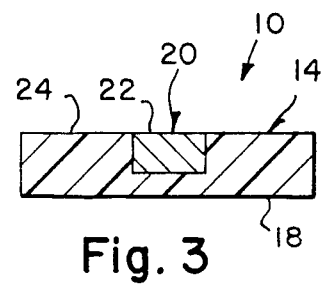
FIG. 3 is a cross sectional view taken along line 3—3 in FIG. 2, showing the magnet carried within the plastic housing.
Figure 2:
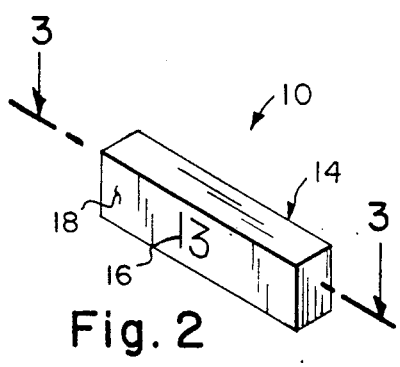
FIG. 2 is an enlarged perspective view of the car locator.

Turning now descriptively to the drawings, in which similar reference characters denote similar elements throughout the several views. FIGS. 1, 2 and 3 illustrate an apparatus 10 for locating a motor vehicle 12. The apparatus 10 contains a rectangular housing 14 fabricated out of plastic material that has indicia 16 upon front surface 18 thereof. A magnetic core 20 is imbedded within the housing 14 with one surface 22 of the core 20 in alignment with rear surface 24 of the housing 14. This allows for magnetically attaching the housing 14 to the motor vehicle 12 so that the indicia 16 can be easily seen at substantial distances from the motor vehicle 12. As shown in FIG. 1, the apparatus 10 is placed upon upper portion of windshield molding 26 of the motor vehicle 12. Other magnetic areas located upon the motor vehicle 12 can also be utilized for accomplishing the same above results.

Figure 5:
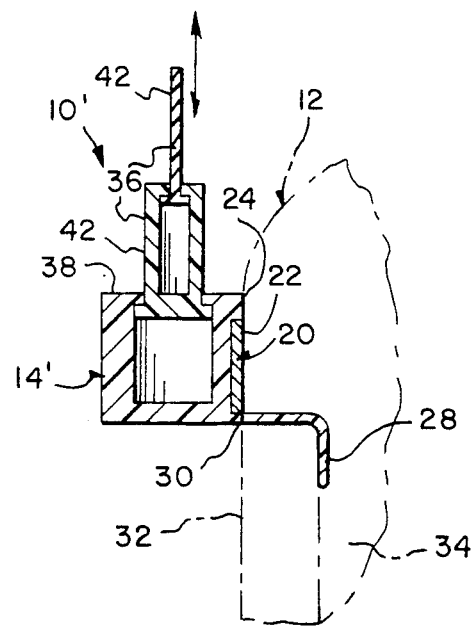
FIG. 5 is a cross sectional view taken along line 5—5 in FIG. 4 showing the internal structure and flap member which engages between upper portion of a door and door frame on the motor vehicle shown in phantom so that the apparatus cannot be easily removed.
Figure 4:
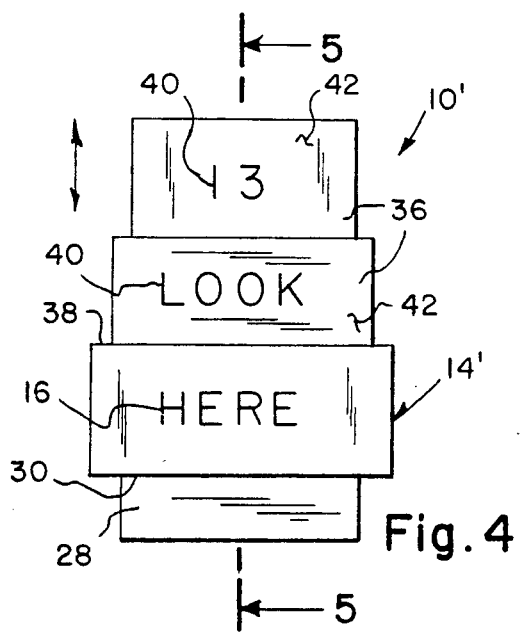
FIG. 4 is a front elevational view of a modification having telescopic segments.

FIGS. 4 and 5 show a modified apparatus 10' further including a flap member 28 extending from rear lower edge 30 of the housing 14' so that the flap member 28 can be secured between upper portion of a door 32 and door frame 34 of the motor vehicle 12, shown in phantom in FIG. 5, in which the apparatus 10' cannot be easily removed therefrom.

A plurality of telescopic panel segments 36 are extendable out of said housing through an opening in top surface 38 of the housing 14'. Each of the panel segments 36 have additional indicia 40 upon front surface 42 thereof. When the panel segments 36 are extended the additional indicia 40 upon the panel segments 36 can be easily seen at substantial greater distances from the motor vehicle 12.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An apparatus for locating a motor vehicle which comprises:
   a) a housing having front, rear and top surfaces and a rear lower edge with indicia on the front surface thereof;
   b) a magnetic core imbedded within said housing and having a rear side in alignment with said rear surface of said housing;
   c) an L-shaped flap extending laterally from said rear lower edge of said housing so that said flap member can be mounted between an upper portion of a door and door frame of the motor vehicle, with a downwardly projecting leg of said L-shaped flap adapted to an interior vertical surface of the vehicle;
   d) a plurality of telescopic panel segments upwardly extendable out of said housing through an opening in said top surface of said housing, each of said panel segments having additional indicia upon a front panel surface thereof so that when said panel segments are extended said indicia provide an elevated message.

* * * * *